(12) United States Patent
Ryugo et al.

(10) Patent No.: US 11,649,918 B2
(45) Date of Patent: May 16, 2023

(54) FLOW PIPE

(71) Applicant: JTEKT CORPORATION, Osaka (JP)

(72) Inventors: Kenichi Ryugo, Kariya (JP); Toshiyuki Saito, Kashiba (JP); Motoo Nakai, Nara (JP); Yoshiaki Ando, Amagun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/375,141

(22) Filed: Jul. 14, 2021

(65) Prior Publication Data

US 2022/0034443 A1 Feb. 3, 2022

(30) Foreign Application Priority Data

Jul. 30, 2020 (JP) .............................. JP2020-129084

(51) Int. Cl.
| | |
|---|---|
| *F16L 9/14* | (2006.01) |
| *F16L 59/147* | (2006.01) |
| *F16L 59/02* | (2006.01) |

(52) U.S. Cl.
CPC .......... *F16L 59/147* (2013.01); *F16L 59/022* (2013.01)

(58) Field of Classification Search
CPC .............................. F16L 59/147; F16L 59/022
USPC ................. 138/149, 108, 113, 148
See application file for complete search history.

(56) References Cited

U.S. PATENT DOCUMENTS

| | | | | | |
|---|---|---|---|---|---|
| 1,419,171 | A | * | 6/1922 | Read | F16L 59/07 138/148 |
| 3,089,520 | A | * | 5/1963 | Huet | G21C 15/20 220/592.2 |
| 3,113,595 | A | * | 12/1963 | Cotman, Jr. | F16L 59/13 138/113 |
| 4,700,751 | A | * | 10/1987 | Fedrick | F16L 59/06 138/104 |
| 4,928,736 | A | * | 5/1990 | Muszynski | F16L 7/00 428/167 |
| 5,996,643 | A | * | 12/1999 | Stonitsch | F16L 59/143 138/143 |
| 6,148,867 | A | * | 11/2000 | Matthews | F16L 59/026 138/149 |
| 6,635,322 | B1 | * | 10/2003 | Korsgaard | F16L 59/14 138/140 |
| 6,926,040 | B1 | * | 8/2005 | Prescott | F16L 59/143 138/148 |
| 8,568,844 | B2 | * | 10/2013 | Whitaker | F16L 59/028 442/178 |
| 8,763,647 | B2 | * | 7/2014 | Quigley | E21B 17/00 138/143 |

(Continued)

FOREIGN PATENT DOCUMENTS

JP   2000-240116 A   9/2000

*Primary Examiner* — James F Hook
(74) *Attorney, Agent, or Firm* — Oblon, McClelland, Maier & Neustadt, L.L.P.

(57) ABSTRACT

There is provided a flow pipe including: a pipe body including a side wall having an opening portion; and a heat insulator arranged at an inner peripheral side of the pipe body and having a flow path through which a fluid flows. The heat insulator has an outer peripheral surface facing with the side wall, and the outer peripheral surface has a flow path structure configured to form a flow path that guides a water droplet generated between the heat insulator and the pipe body to the opening portion.

9 Claims, 9 Drawing Sheets

(56) References Cited

U.S. PATENT DOCUMENTS

| | | | |
|---|---|---|---|
| 2009/0139596 A1* | 6/2009 | Kuyl .................... | G01M 3/283 |
| | | | 138/104 |
| 2013/0213515 A1* | 8/2013 | Secoura ................ | F16L 59/14 |
| | | | 29/527.1 |
| 2014/0366980 A1* | 12/2014 | Wardle ................ | F16L 59/022 |
| | | | 156/78 |

* cited by examiner

FLOW PIPE

CROSS-REFERENCE TO RELATED APPLICATIONS

This application is based on and claims priority under 35 USC 119 from Japanese Patent Application No. 2020-129084 filed on Jul. 30, 2020, the contents of which are incorporated herein by reference.

TECHNICAL FIELD

The present disclosure relates to a flow pipe.

BACKGROUND ART

In related art, a technique of arranging a heat insulator on an outer periphery of a pipe (pipe body) is known (for example, JP2000-240116A).

Even when the heat insulator is arranged on the outer periphery of the pipe body, water droplets may be generated and stay between the pipe body and the heat insulator due to dew condensation. In this case, a flow pipe may be contaminated or deteriorated by the water droplets.

SUMMARY OF INVENTION

According to an aspect of the present disclosure, a flow pipe includes: a pipe body including a side wall having an opening portion; and a heat insulator arranged at an inner peripheral side of the pipe body and having a flow path through which a fluid flows. The heat insulator has an outer peripheral surface facing with the side wall, and the outer peripheral surface has a flow path structure configured to form a flow path that guides a water droplet generated between the heat insulator and the pipe body to the opening portion. According to this aspect, the outer peripheral surface of the heat insulator has the flow path structure configured to form the flow path that guides the water droplet to the opening portion. As a result, even when the water droplet is generated between the pipe body and the heat insulator, the water droplet can be discharged to outside through the opening portion. Therefore, the water droplet can be prevented from staying between the pipe body and the heat insulator. Since the heat insulator is arranged on the inner peripheral side of the pipe body, the heat insulator can be protected by the pipe body.

According to another aspect of the present disclosure, a flow pipe includes: a pipe body having a flow path through which a fluid flows; and a heat insulator arranged to surround the pipe body in a peripheral direction of the pipe body at an outer peripheral side of the pipe body. The heat insulator includes a side wall having an opening portion, and having an inner peripheral surface facing with the pipe body, and the inner peripheral surface has a flow path structure configured to form a flow path that guides a water droplet generated between the heat insulator and the pipe body to the opening portion. According to this aspect, the inner peripheral surface of the heat insulator has the flow path structure configured to form the flow path that guides the water droplet to the opening portion. As a result, even when the water droplet is generated between the pipe body and the heat insulator, the water droplet can be discharged to outside through the opening portion. Therefore, the water droplet can be prevented from staying between the pipe body and the heat insulator.

According to the aspect described above, the flow path structure may include a groove formed along a peripheral direction of the heat insulator. According to this aspect, the flow path can be easily formed by forming a gap by the groove between the heat insulator and the pipe body.

According to the aspect described above, the flow path structure may include a protruding portion that is in contact with the pipe body. According to this aspect, the flow path can be easily formed by forming a gap by the protruding portion between a portion other than the protruding portion of the heat insulator and the pipe body.

According to the aspect described above, the heat insulator may include an aerogel. According to this aspect, the aerogel can provide high heat insulation performance for the flow pipe.

The present disclosure can be implemented in various forms in addition to the flow pipe described above, and can be implemented, for example, in a method of manufacturing the flow pipe, or in a grinding machine including the flow pipe.

DESCRIPTION OF EMBODIMENTS

Figure 1:
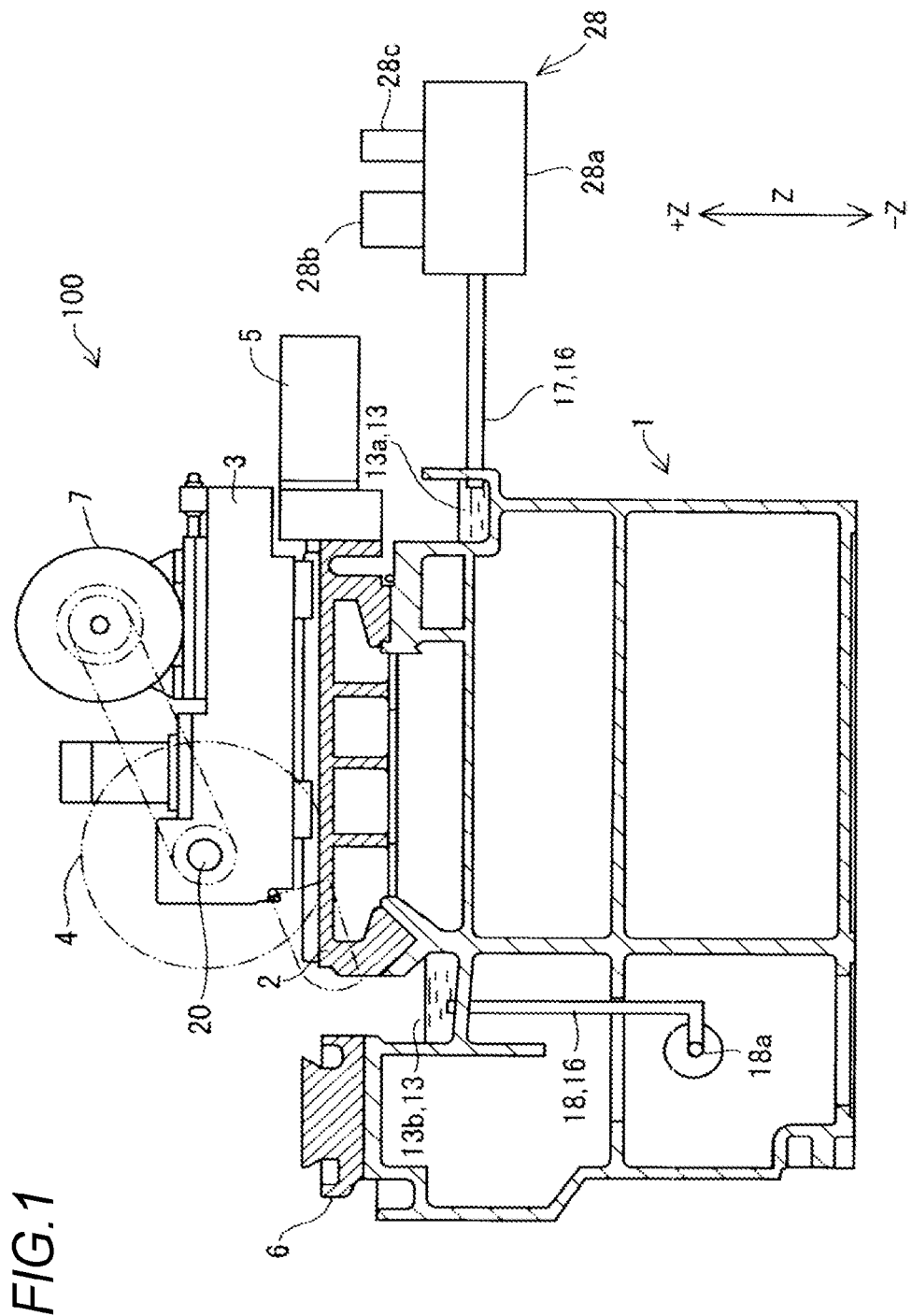
FIG. 1 is a view of illustrating a grinding machine which includes a flow pipe according to each of a first embodiment to a third embodiment of the present disclosure.
Figure 2:
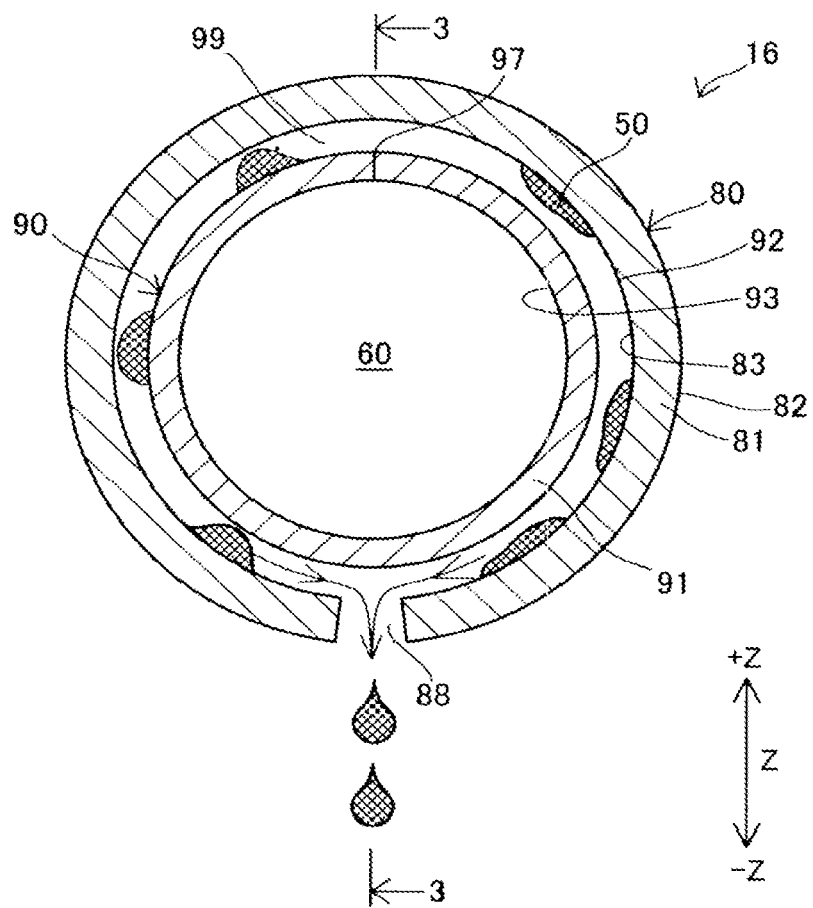
FIG. 2 is a view of schematically illustrating a cross section of the flow pipe of the first embodiment.

FIG. 1 shows a grinding machine 100 which includes a flow pipe 16 according to each of a first embodiment to a third embodiment of the present disclosure. FIG. 1 shows the flow pipe 16 of the first embodiment as a representative example. A Z direction shown in FIG. 1 is a direction along a gravity direction, a −Z direction is the gravity direction (downward direction), and a +Z direction is an antigravity direction (upward direction). In FIG. 2 and subsequent drawings, the Z direction, the −Z direction, and the +Z direction are also shown as necessary.

The grinding machine 100 includes a bed 1, a slide base 2, a grinding base 3, a grinding wheel 4, a motor 7, and a table 6. The bed 1 is a member serving as a base of the grinding machine 100, and is formed of a metal such as cast iron. A coolant receiver 13 is formed on an upper surface of the bed 1. The coolant receiver 13 receives a coolant that is supplied to and scattered from a portion to be ground of a workpiece to be ground by the grinding machine 100. The coolant receiver 13 has a concave cross-sectional shape. The coolant receiver 13 is provided on each of two left-right direction sides shown in FIG. 1. The coolant receiver 13 located on a right side is also referred to as a first coolant receiver 13a, while the coolant receiver 13 located on a left side is also referred to as a second coolant receiver 13b.

The slide base 2 is arranged on the bed 1 to support the grinding base 3. The slide base 2 is configured to linearly reciprocate horizontally along an axial direction of the grinding wheel 4. The grinding wheel 4 and the motor 7 are arranged on the grinding base 3. The grinding wheel 4 is rotated together with a grinding shaft 20 by the motor 7 around an axis of the grinding shaft 20. The grinding base 3 is configured to linearly reciprocate in a horizontal direction orthogonal to a moving direction of the slide base 2. A servo motor 5 generates power for moving the grinding base 3 via a ball screw (not shown). A servo motor (not shown) that generates power for moving the slide base 2 is arranged on the bed 1. The table 6 is fixed on the bed 1. A headstock and a tailstock (not shown) are placed on the table 6. The workpiece to be ground is detachably held by the headstock and the tailstock.

The grinding machine 100 further includes a first flow pipe 17, a second flow pipe 18, and a coolant supply device 28. The first flow pipe 17 communicates with the first coolant receiver 13a so as to allow a coolant of the first coolant receiver 13a to flow therethrough. The first flow pipe 17 extends in the horizontal direction. The first flow pipe 17 is fixed to the bed 1 by a fixing member such as a bracket (not shown). The first flow pipe 17 may be inclined such that the side of the first coolant receiver 13 (upstream side) is located higher than a downstream side so as to cause the coolant, which is a fluid, to smoothly flow to the coolant supply device 28.

The second flow pipe 18 communicates with the second coolant receiver 13b so as to allow a coolant of the second coolant receiver 13b to flow therethrough. The second flow pipe 18 includes a portion 18a which extends in the horizontal direction. The portion 18a is arranged so as to extend along inside of the bed 1 in a direction perpendicular to a paper surface. A downstream end portion (not shown) of the second flow pipe 18 is connected to the coolant supply device 28. The second flow pipe 18 is fixed to the bed 1 by a fixing member such as a bracket (not shown). The second flow pipe 18 may be inclined such that the side of the second coolant receiver 13b (upstream side) is located higher than a downstream side so as to cause the coolant to smoothly flow to the coolant supply device 28. When the first flow pipe 17 and the second flow pipe 18 are used without being distinguished from each other, the first flow pipe 17 and the second flow pipe 18 are simply referred to as the flow pipes 16.

The coolant supply device 28 includes a coolant tank 28a in which the coolants from the first flow pipe 17 and the second flow pipe 18 are collected and stored, a separation device 28b that is installed on the coolant tank 28a to separate grinding chips from the coolants in the coolant tank 28a, and a supply unit 28c that is installed on the coolant tank 28a to supply the coolants in the coolant tank 28a to the portion to be ground of the workpiece by, for example, a flexible pipe (not shown).

A. First Embodiment

Figure 3:
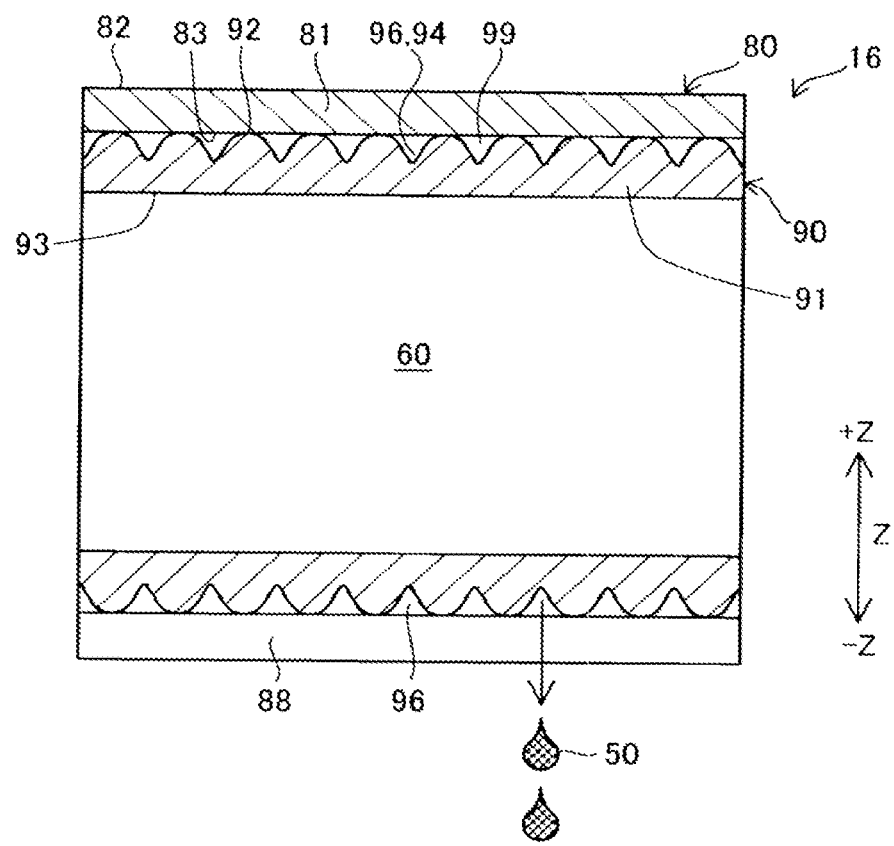
FIG. 3 is a view of schematically illustrating a cross section taken along 3-3 of FIG. 2.

FIG. 2 schematically shows a cross section of the flow pipe 16 of the first embodiment. FIG. 3 schematically shows a cross section taken along 3-3 of FIG. 2. FIG. 3 shows a part of the flow pipe 16 which extends in a longitudinal direction. When a structure of the flow pipe 16 described below is used for the second flow pipe 18, the structure is used for the portion 18a extending in the horizontal direction. The flow pipe 16 has a double structure, and includes a pipe body 80 and a heat insulator 90. The longitudinal direction of the pipe body 80 and the heat insulator 90 is the same as the longitudinal direction of the flow pipe 16. As shown in FIG. 2, the pipe body 80 has a cylindrical shape and is formed of a metal such as cast iron or stainless steel. In alternative embodiments, the pipe body 80 may also be formed of synthetic resin. The pipe body 80 is arranged to surround an outer periphery of the heat insulator 90, thereby protecting the heat insulator 90. The pipe body 80 includes a side wall 81 in which an opening portion 88 is formed. The side wall 81 extends in the longitudinal direction of the pipe body 80 to form an outer peripheral surface 82 and an inner peripheral surface 83 of the pipe body 80. The opening portion 88 allows inside and outside of the pipe body 80 to communicate with each other. The opening portion 88 is formed along the longitudinal direction of the pipe body 80. In the present embodiment, the opening portion 88 is a slit formed from one end to the other end in the longitudinal direction of the pipe body 80. In a state where the flow pipe 16 is assembled to the grinding machine 100, the opening portion 88 is located in a portion located on a gravity direction (−Z direction) side of the side wall 81 of the pipe body 80. The inner peripheral surface 83 of the pipe body 80 may be subjected to water repellent treatment such as fluorine coating so as to smoothly guide a water droplet 50 to the opening portion 88.

The heat insulator 90 is arranged on an inner peripheral side (radially inner side) of the pipe body 80. In the present embodiment, the heat insulator 90 is press-fitted into the pipe body 80 so as to be arranged on the inner peripheral side of the pipe body 80. The heat insulator 90 forms a flow path 60 through which the coolant, which is a fluid, flows. The heat insulator 90 has a cylindrical shape.

As shown in FIG. 3, the heat insulator 90 includes a side wall 91 that forms an outer peripheral surface 92 facing the inner peripheral surface 83 of the side wall 81, and an inner peripheral surface 93 defining the flow path 60. The outer peripheral surface 92 is in contact with the inner peripheral surface 83 of the side wall 81. The outer peripheral surface 92 includes a flow path structure 94 in which a flow path 99 is formed. The flow path structure 94 includes a groove 96 formed in the outer peripheral surface 92 along a peripheral direction of the heat insulator 90. A plurality of the grooves 96 are formed at regular intervals along the longitudinal direction of the flow pipe 16. The flow path 99 is a gap formed by the groove 96 between the pipe body 80 and the heat insulator 90. The flow path 99 communicates with the opening portion 88 so as to guide the water droplet 50 generated due to dew condensation between the heat insulator 90 and the pipe body 80 to the opening portion 88. That is, the water droplet 50 flows through the flow path 99 due to gravity and is guided to the opening portion 88. As a result, the water droplet 50 is discharged to outside of the flow pipe 16.

According to the first embodiment, as shown in FIG. 3, the outer peripheral surface 92 of the heat insulator 90 includes the flow path structure 94 in which the flow path 99 that guides the water droplet 50 to the opening portion 88 is formed. As a result, the flow pipe 16 has high heat insulation performance due to the heat insulator 90, and the water droplet 50 can be discharged to the outside via the opening portion 88 even when the water droplet 50 is generated between the pipe body 80 and the heat insulator 90, so that the water droplet 50 can be prevented from staying between the pipe body 80 and the heat insulator 90. Therefore, occurrence of defects such as deterioration (for example, corrosion) or contamination of the pipe body 80 caused by the water droplet 50 can be prevented. Since the heat insulator 90 is arranged on the inner peripheral side of pipe body 80, the heat insulator 90 can be protected by the pipe body 80.

According to the first embodiment, since the flow pipe 16 has high heat insulation performance due to the heat insulator 90, heat of the coolant flowing through the flow path 60 can be prevented from being transmitted to a body (for example, the bed 1) of the grinding machine 100. As a result, thermal deformation, such as expansion of the grinding machine 100 caused by heat, can be prevented, and thus a decrease in processing accuracy of the workpiece processed by the grinding machine 100 can be prevented. Since the high heat insulation performance is provided by the heat insulator 90, there is no need to provide a large gap between the flow pipe 16 and the body (for example, the bed 1) of the grinding machine 100 to reduce heat conduction, so that the grinding machine 100 can be downsized. Here, when the flow pipe 16 is formed of a metal such as cast iron without using the heat insulator 90, in order to reduce heat conduction from the flow pipe 16 to the body of the grinding machine 100, it is necessary to set a fixing member, such as a bracket for fixing the flow pipe 16, to a minimum size. As a result, due to vibration of the grinding machine 100, stress is likely to concentrate on a portion, which is supported by the fixing member, of the flow pipe 16, and the flow pipe 16 may thus be deteriorated (for example, damaged). The fixing member may also be deteriorated (for example, damaged) due to the vibration. On the other hand, according to the first embodiment, since the flow pipe 16 has the high heat insulation performance due to the heat insulator 40, it is not necessary to set the fixing member to the minimum size to reduce the heat conduction, and thus a degree of freedom in design can be improved. Therefore, durability of the flow pipe 16 and the fixing member can be improved.

B. Second Embodiment

Figure 4:
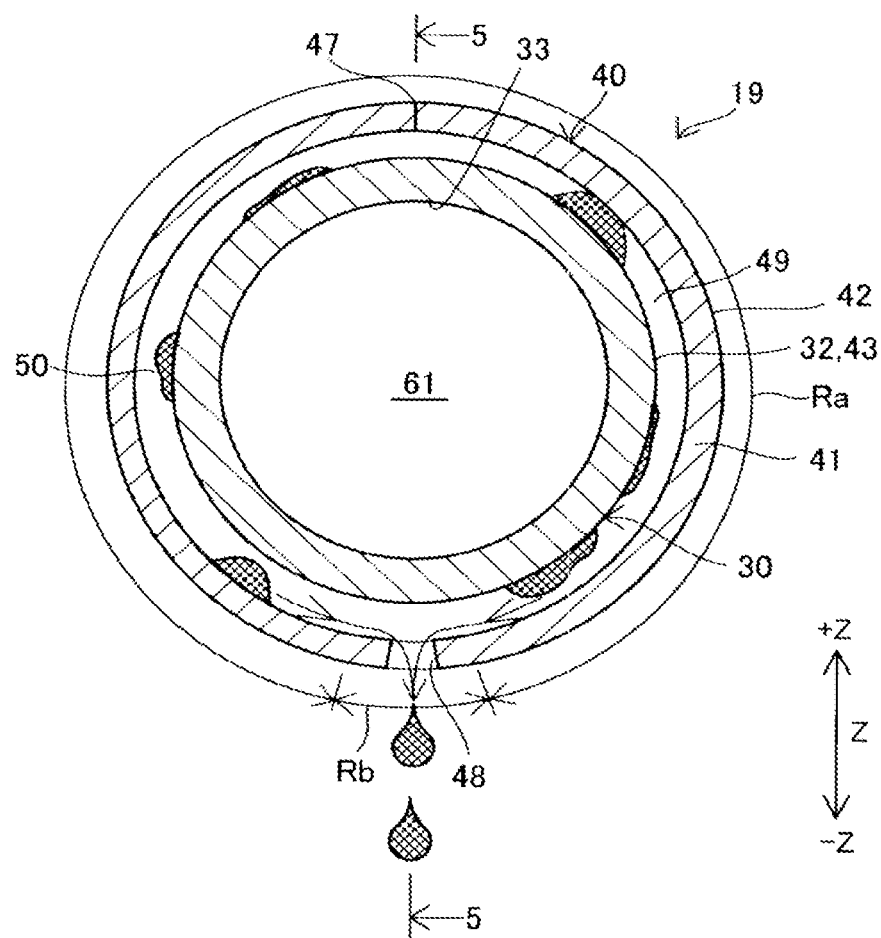
FIG. 4 is a view of schematically illustrating a cross section of the flow pipe according to the second embodiment.
Figure 5:
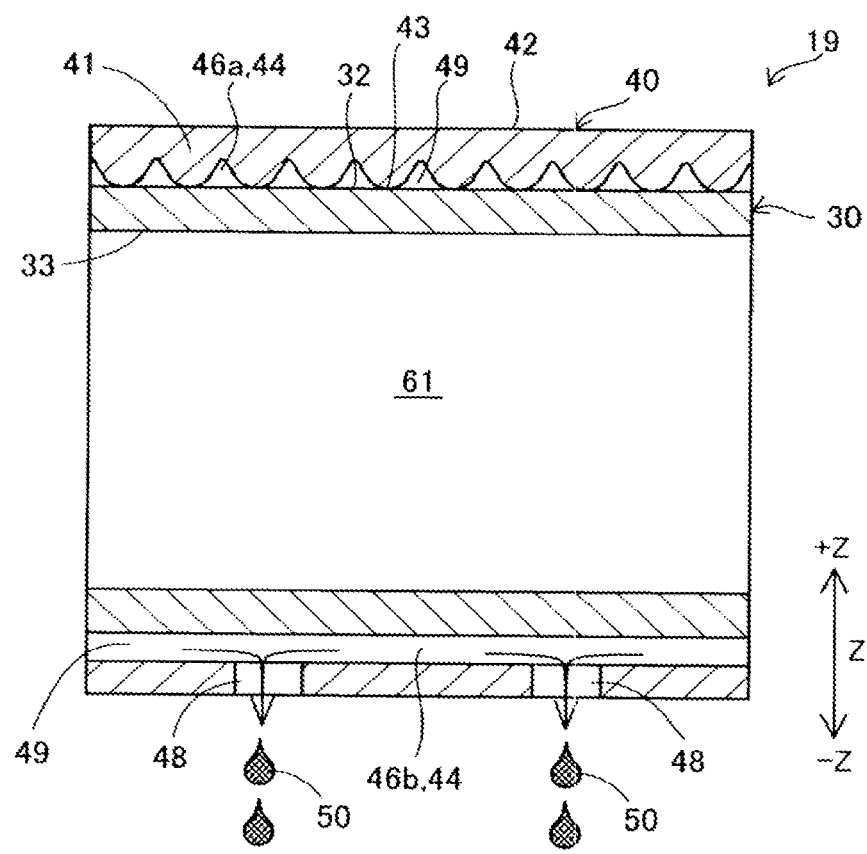
FIG. 5 is a view of schematically illustrating a cross section taken along 5-5 of FIG. 4.

FIG. 4 schematically shows a cross section of a flow pipe 19 according to the second embodiment. FIG. 5 schematically shows a cross section taken along 5-5 of FIG. 4. FIG. 5 shows a part of the flow pipe 19 which extends in the longitudinal direction. The grinding machine 100 may include the flow pipe 19 of the second embodiment instead of the flow pipe 16 of the first embodiment. Configurations similar to those of the first embodiment are denoted by the same reference numerals, and description thereof is omitted as appropriate.

The flow pipe 19 has a double structure, and includes a pipe body 30 and a heat insulator 40. The longitudinal direction of the pipe body 30 and the heat insulator 40 is the same as the longitudinal direction of the flow pipe 19. As shown in FIG. 4, the pipe body 30 forms a flow path 61 through which the coolant, which is a fluid, flows. The flow path 61 is defined by an inner peripheral surface 33 of the pipe body 30. The pipe body 30 has a cylindrical shape and is formed of a metal such as cast iron or stainless steel as in the first embodiment. In alternative embodiments, the pipe body 30 may also be formed of synthetic resin. An outer peripheral surface 32 of the pipe body 30 may be subjected to water repellent treatment such as fluorine coating.

The heat insulator 40 is arranged so as to surround the pipe body 30 in a peripheral direction on an outer peripheral side (radially outer side) of the pipe body 30. The same material as that of the first embodiment can be used as a material of the heat insulator 40. The flow pipe 19 is formed by forming a cylindrical shape such that the outer peripheral surface 32 of the pipe body 30 is surrounded by the sheet-shaped heat insulator 40 in which opening portions 48 are formed. The heat insulator 40 includes a side wall 41 in which the opening portions 48 are formed. The side wall 41 extends in the longitudinal direction of the heat insulator 40 to form an outer peripheral surface 42 and an inner peripheral surface 43 of the heat insulator 40. As shown in FIG. 5, the opening portions 48 are a plurality of holes formed at regular intervals. The opening portions 48 allow inside and outside of the heat insulator 40 to communicate with each other. The opening portions 48 are located in a portion located on a gravity direction (-Z direction) side of the side wall 41 of the heat insulator 40. Since the opening portions 48 are spaced apart from each other, a total opening area of the opening portions 48 of the heat insulator 40 can be prevented from increasing. As a result, a decrease in heat insulation performance of the heat insulator 40 can be prevented.

The inner peripheral surface 43 faces the outer peripheral surface 32 of the pipe body 30. The inner peripheral surface 43 is in contact with the outer peripheral surface 32 of the pipe body 30. The inner peripheral surface 43 includes a flow path structure 44 in which a flow path 49 is formed. The flow path 49 communicates with the opening portions 48 so as to guide the water droplet 50 generated due to dew condensation between the heat insulator 40 and the pipe body 30 to the opening portions 48. The flow path structure 44 includes a first groove 46a and a second groove 46b formed in the inner peripheral surface 43. The first groove 46a is formed along a peripheral direction of the heat insulator 40. The first groove 46a is formed in a first region Ra (FIG. 4) excluding the vicinity of the opening portions 48 in the peripheral direction. The first groove 46a guides the water droplet 50 downward by gravity along the peripheral direction. A plurality of the first grooves 46a are formed at regular intervals along the longitudinal direction of the flow pipe 19. The second groove 46b is formed in a second region Rb around the opening portions 48. The second groove 46b is formed in the entire second region Rb, and is connected to the plurality of opening portions 48. In this way, the flow path 49 is a gap formed by the first groove 46a and the second groove 46b between the pipe body 30 and the heat insulator 40. The water droplet 50 flowing through the first groove 46a moves in the longitudinal direction by flowing through the second groove 46b due to gravity or the like, and reaches the opening portions 48. As a result, the water droplet 50 is discharged to outside of the flow pipe 19. A bottom surface of the second groove 46b may be formed to be inclined toward the opening portions 48. In this way, the water droplet 50 can be more smoothly guided to the opening portions 48.

According to the second embodiment, the inner peripheral surface 43 of the heat insulator 40 includes the flow path structure 44 in which the flow path 49 that guides the water droplet 50 to the opening portions 48 is formed. As a result, the flow pipe 19 has high heat insulation performance due to the heat insulator 40, and the water droplet 50 can be discharged to the outside via the opening portions 88 even when the water droplet is generated between the pipe body 30 and the heat insulator 40, so that the water droplet 50 can be prevented from staying between the pipe body 30 and the heat insulator 40. Therefore, occurrence of defects such as deterioration (for example, corrosion) or contamination of the pipe body 30 caused by the water droplet 50 can be prevented. According to the second embodiment, the flow pipe 19 having the double structure includes the heat insulator 40 on an outer side (FIG. 4). As a result, in a case where a structure having high transparency (for example, silica aerogel) is used as the heat insulator 40, since the pipe body 30 can be visually recognized from the outside, inspection of the pipe body 30 can be easily performed.

As in the first embodiment, in the second embodiment, since the flow pipe 19 also has the high heat insulation performance due to the heat insulator 40, the heat of the coolant flowing through the flow path 61 can be prevented from being transmitted to the body (for example, the bed 1) of the grinding machine 100. As a result, the thermal deformation, such as the expansion of the grinding machine 100 caused by the heat, can be prevented, and thus the decrease in the processing accuracy of the workpiece processed by the grinding machine 100 can be prevented. As in the first embodiment, since it is not necessary to set a fixing member of the flow pipe 19 to a minimum size to reduce the heat conduction, a degree of freedom in design can be improved, and thus durability of the flow pipe 19 and the fixing member can be improved.

C. Third Embodiment

Figure 6:
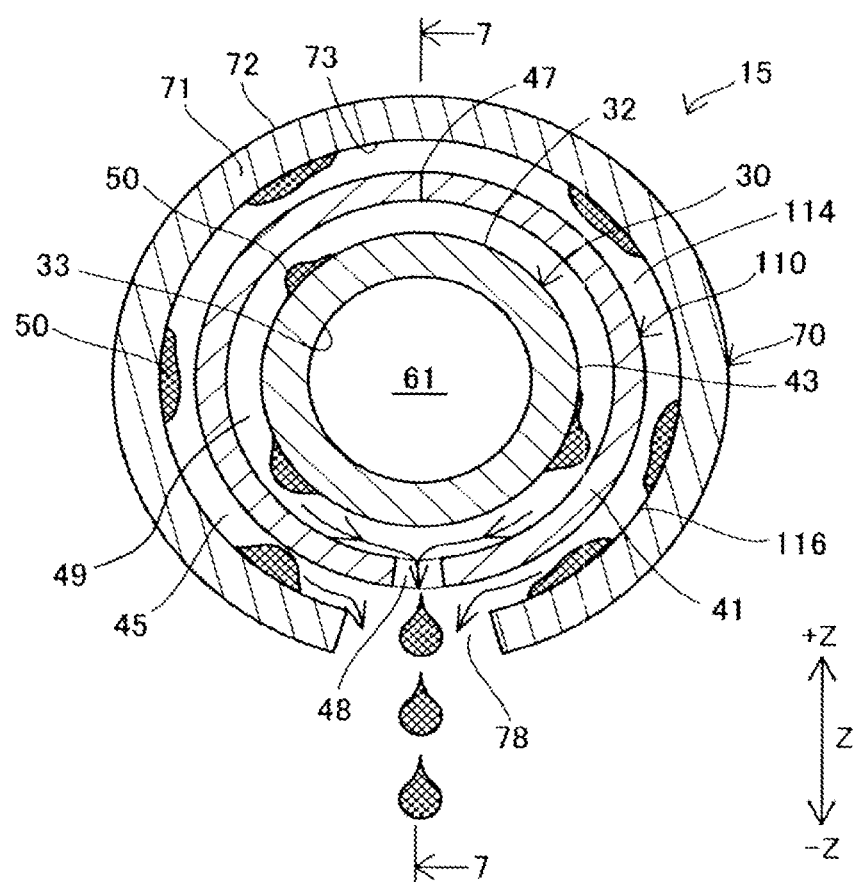
FIG. 6 is a view of schematically illustrating a cross section of the flow pipe of the third embodiment.
Figure 7:
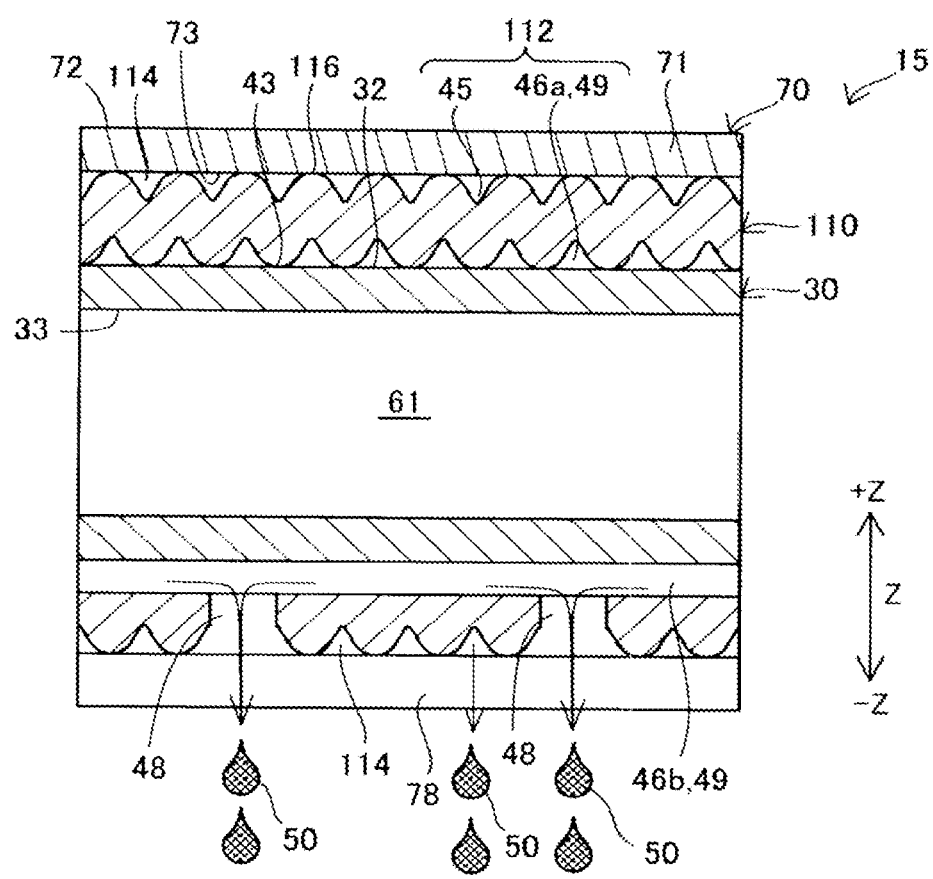
FIG. 7 is a view of schematically illustrating a cross section taken along 7-7 of FIG. 6.

FIG. 6 schematically shows a cross section of a flow pipe 15 of the third embodiment. FIG. 7 schematically shows a cross section taken along 7-7 of FIG. 6. FIG. 7 shows a part of the flow pipe 15 which extends in the longitudinal direction. The grinding machine 100 may include the flow pipe 15 of the third embodiment instead of the flow pipe 16 of the first embodiment. Configurations similar to those of the first embodiment and the second embodiment are denoted by the same reference numerals, and description thereof is omitted as appropriate.

The flow pipe 15 has a configuration in which an outer flow pipe 70 is arranged outside a double structure obtained by partially changing the structure of the heat insulator 40 of the flow pipe 19 (FIG. 4) of the second embodiment. The flow pipe 15 has a triple structure, and includes the pipe body 30, a heat insulator 110, and the outer flow pipe 70. The longitudinal direction of each of the pipe body 30, the heat insulator 110, and the outer flow pipe 70 is the same as the longitudinal direction of the flow pipe 15. The heat insulator 110 is provided with a flow path 45 (FIG. 7) on an outer peripheral side, which is different from the heat insulator 40 (FIGS. 4 and 5) of the second embodiment.

An outer peripheral surface 116 of the heat insulator 110 faces an inner peripheral surface 73 of the outer flow pipe 70. The outer peripheral surface 116 is in contact with the inner peripheral surface 73 of the outer flow pipe 70. The heat insulator 110 has a flow path structure 112 in which flow paths 45 and 49 are formed to guide water droplets generated due to dew condensation between the heat insulator 110 and the pipe body 30 and between the heat insulator 110 and the outer flow pipe 70 to opening portions 48 and 78. Details of the flow path structure 112 will be described later below.

The inner peripheral surface 73 of the outer flow pipe 70 faces the outer peripheral surface 116 of the heat insulator 110. The outer flow pipe 70 has a cylindrical shape and is formed of a metal such as cast iron or stainless steel. In alternative embodiments, the outer flow pipe 70 may also be formed of synthetic resin. The outer flow pipe 70 is arranged to surround the heat insulator 110 on the outer peripheral side of the heat insulator 110, thereby protecting the heat insulator 110. The outer flow pipe 70 includes a side wall 71 in which the opening portion 78 is formed. The side wall 71 extends in the longitudinal direction of the outer flow pipe 70 and forms an outer peripheral surface 72 and the inner peripheral surface 73 of the outer flow pipe 70. The opening portion 78 allows inside and outside of the outer flow pipe 70 to communicate with each other. The opening portion 78 is a slit formed along the longitudinal direction of the outer flow pipe 70 from one end to the other end in the longitudinal direction of the outer flow pipe 70. In a state where the flow pipe 15 is assembled to the grinding machine 100, the opening portion 78 is located in a portion located on a gravity direction (−Z direction) side of the side wall 71 of the outer flow pipe 70. The inner peripheral surface 73 of the outer flow pipe 70 may be subjected to water repellent treatment such as fluorine coating. In alternative embodiments, the opening portion 78 may be a plurality of holes formed at intervals in the longitudinal direction of the outer flow pipe 70. In this case, in order to smoothly discharge the water droplet 50 outward, each opening portion 78 is preferably arranged directly below the opening portions 48.

The flow path structure 112 of the heat insulator 110 forms the flow path 49 as a gap between the pipe body 30 and the heat insulator 110, and forms the flow path 45 as a gap between the heat insulator 110 and the outer flow pipe 70. The flow path structure 112 includes the first groove 46a and the second groove 46b formed in the inner peripheral surface 43, and a third groove 114 formed in the outer peripheral surface 116. A configuration of the third groove 114 is the same as that of the groove 46 (FIG. 3) of the first embodiment. That is, the third groove 114 is formed along a peripheral direction of the outer peripheral surface 116, and a plurality of the third grooves 114 are provided at regular intervals along the longitudinal direction of the outer flow pipe 70.

The water droplet 50 generated due to dew condensation between the outer flow pipe 70 and the heat insulator 110 flows through the third groove 114 and is discharged to outside through the opening portion 78. The water droplet 50 generated due to dew condensation between the heat insulator 110 and the pipe body 30 flows through the first groove 46a and the second groove 46b, and is discharged to the outside through the opening portion 48 and the opening portion 78.

According to the third embodiment, in the flow pipe 15, the outer peripheral surface 116 and the inner peripheral surface 43 of the heat insulator 110 includes the flow path structure 112 that guides the water droplet to the opening portions 48 and 78. As a result, the flow pipe 15 has high heat insulation performance due to the heat insulator 110, and the generated water droplet 50 can be discharged to the outside via the opening portions 48 and 78 even when the water droplet is generated between the pipe body 30 and the heat insulator 110 or between the heat insulator 110 and the outer flow pipe 70. As a result, the water droplet 50 can be prevented from staying between the pipe body 30 and the heat insulator 110 or between the heat insulator 110 and the outer flow pipe 70. Therefore, occurrence of defects such as deterioration (for example, corrosion) or contamination of the pipe body 30 and the outer flow pipe 70 caused by the water droplet 50 can be prevented. Since the flow pipe 15 includes the outer flow pipe 70, the heat insulator 110 can be protected. Further, as in the first embodiment and the second embodiment, since the flow pipe 15 has high heat insulation performance due to the heat insulator 110, heat of a coolant flowing through the flow path 61 can be prevented from being transmitted to the body (for example, the bed 1) of the grinding machine 100. As a result, the thermal deformation, such as the expansion of the grinding machine 100 caused by the heat, can be prevented, and thus the decrease in the processing accuracy of the workpiece processed by the grinding machine 100 can be prevented. As in the first embodiment and the second embodiment, since it is not necessary to set a fixing member of the flow pipe 15 to a minimum size to reduce the heat conduction, a degree of freedom in design can be improved, and thus durability of the flow pipe 15 and the fixing member can be improved.

D. Material of Heat Insulator

For the heat insulators 40, 90, and 110, for example, a heat insulating material such as aerogel or glass wool can be used. As the aerogel, a fiber structure made of glass, synthetic resin, or a composite material thereof is used as a base material, and for example, silica aerogel, carbon aerogel, or alumina aerogel is used. As the aerogel, an organic-inorganic hybrid aerogel in which an organic substance and an inorganic substance such as a silica skeleton are mixed at a molecular level, for example, polymethylsilsesquioxane aerogel, may be used so as to improve strength. The heat insulators 40, 90, and 110 of the above-described embodiments are formed by forming a heat insulating sheet, which is produced by supporting silica aerogel on carbon fibers or fibers formed by synthetic resin, into a cylindrical shape. Joining portions 47 and 97 (FIGS. 2 and 4), where end portions are joined to each other when molding the cylindrical shape, are bonded through using an adhesive such as epoxy resin. The heat insulators 40, 90, and 110 may also be formed by impregnating a resin sheet formed by glass fibers or the like or a nonwoven fabric sheet formed in the cylindrical shape with the aerogel. Since the heat insulators 40, 90, and 110 contain the aerogel, the flow pipes 15, 16, and 19 can be formed to easily have the high heat insulation performance. The aerogel, such as silica aerogel, generally has high water repellency. Therefore, since the heat insulators 40, 90, and 110 contain the aerogel, the water droplet 50 can be smoothly guided to the opening portions 48 and 88. As in the first embodiment, by forming the flow path 60 through which the coolant flows by the heat insulator 90 containing the aerogel which has high water repellency, the coolant can more smoothly flow to the coolant supply device 28 on the downstream side.

E. Alternative Embodiment

E-1. Alternative Embodiment 1

Although the flow pipes 15, 16, and 19 are provided to cause the coolant supplied to the portion to be ground of the workpiece to flow in each of the above embodiments, the flow pipes 15, 16, and 19 may also be used to cause another fluid to flow. For example, when the grinding machine 100 includes a recovery mechanism that recovers bearing oil as a fluid supplied between the grinding shaft 20 and a bearing (not shown) of the grinding shaft 20, the configuration of each of the flow pipes 15, 16, and 19 of the present disclosure can be applied to the recovery mechanism.

E-2. Alternative Embodiment 2

The groove 96, the first groove 46a, and the third groove 114 in the above embodiments do not necessarily extend in the peripheral direction, and may extend in other directions or may meander.

E-3. Alternative Embodiment 3

The flow path structures 44, 94, and 112 in the above embodiments are not limited to the above-described shapes. Hereinafter, specific examples of other shapes will be described.

Figure 8:
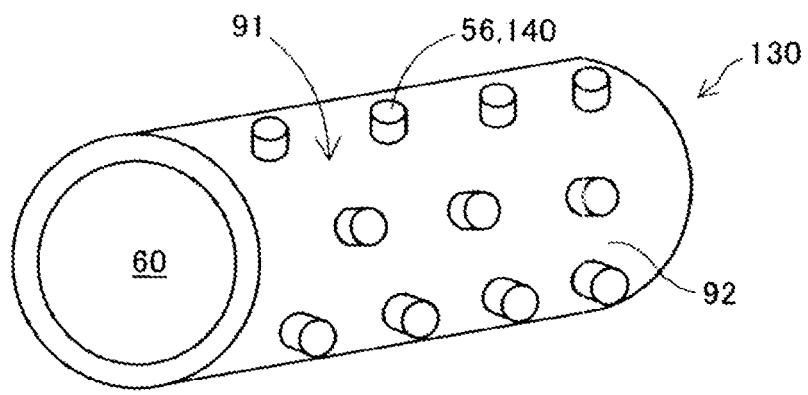
FIG. 8 is a schematic view of a heat insulator showing an example of an alternative embodiment 3.
Figure 9:
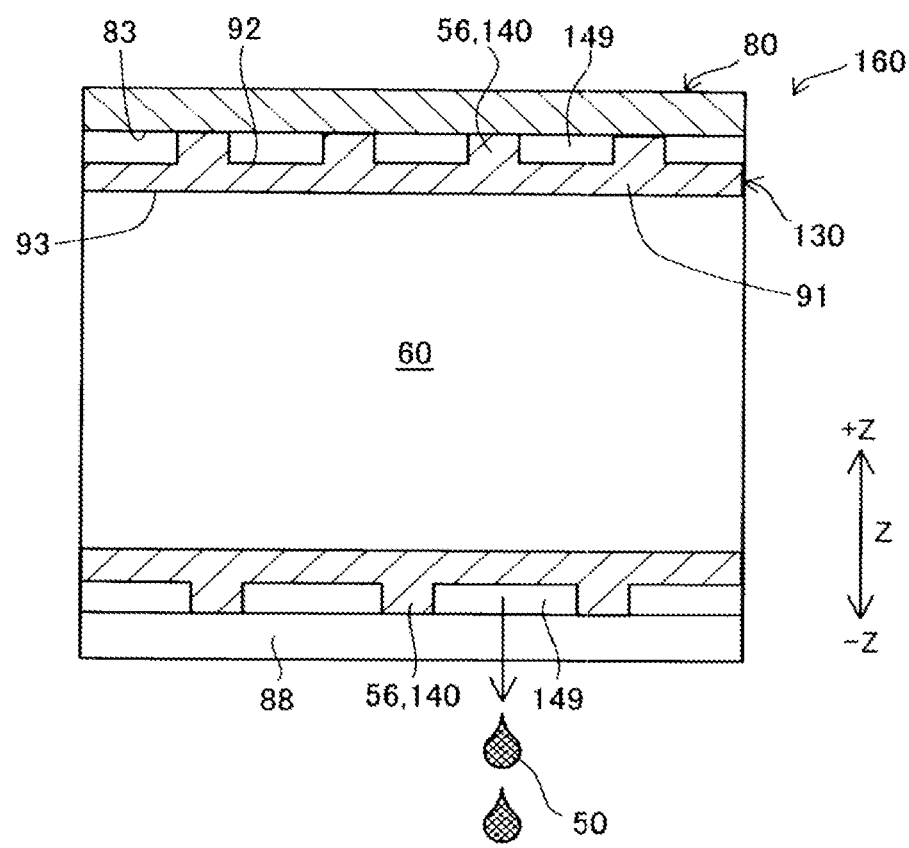
FIG. 9 is a schematic cross-sectional view of a flow pipe showing an example of the alternative embodiment 3.

FIG. 8 is a schematic view of a heat insulator 130 showing an example of an alternative embodiment 3. FIG. 9 is a schematic cross-sectional view of a flow pipe 160 showing an example of the alternative embodiment 3. FIGS. 8 and 9 are diagrams serving as modifications of the first embodiment. The heat insulator 130 shown in FIG. 8 includes a plurality of protruding portions 56 that form a flow path structure 140 on the outer peripheral surface 92. The plurality of protruding portions 56 are randomly formed in the peripheral direction and the longitudinal direction. As shown in FIG. 9, among the plurality of protruding portions 56, the protruding portions 56 other than those facing the opening portion 88 are in contact with the inner peripheral surface 83 of the pipe body 80. As a result, a flow path 149 is formed as a gap between the heat insulator 130 and the pipe body 80. That is, the flow path 149 is formed by forming a gap by the protruding portion 56 in the outer peripheral surface 42 of the heat insulator 130 between a portion other than the protruding portion 56 and the pipe body 80. The flow path 149 communicates with the opening portion 88 and guides the water droplet 50 to the opening portion 88. In this way, the flow path 149 can be easily formed by forming the gap by the protruding portion 56. The alternative embodiment 3 also has the same effects as those of the first embodiment. For example, the flow pipe 160 has high heat insulation performance due to the heat insulator 130, and the generated water droplet 50 can be discharged to the outside via the opening portion 88 even when the water droplet 50 is generated between the pipe body 80 and the heat insulator 130, so that the water droplet 50 can be prevented from staying between the pipe body 80 and the heat insulator 130. The flow path structure 140 may also include the protruding portion 56 and the groove 96 (FIG. 2) of the first embodiment. The flow path structure 140 including the protruding portion 56 described above can also be applied to the second embodiment and the third embodiment in the same manner.

E-4. Alternative Embodiment 4

Although the opening portions 48 (FIGS. 5 and 7) are holes arranged at intervals in the second embodiment and the third embodiment, the opening portion 48 may also be a slit formed along the longitudinal direction.

E-5. Alternative Embodiment 5

In the above-described embodiments, the method of forming the heat insulators 40, 90, and 110 is not limited to the above-described method. For example, the heat insulators 40, 90, and 110 may be formed by forming two heat insulating sheets into semi-cylindrical shapes and then bonding two end portions of each of the heat insulating sheets to each other. In this case, it is preferable that the bonded two joining portions are arranged to be located in the Z direction, which is the direction along the gravity direction, at a position other than an uppermost portion of each of the heat insulators 40, 90, and 110, for example, in the vicinity of a center. In this way, the water droplet can be prevented from entering inside of the heat insulators 40, 90, and 110 from the joining portions.

The present disclosure is not limited to the above-described embodiments, and can be achieved by various configurations without departing from the gist thereof. For example, the technical features of the embodiments corresponding to the technical features of the aspects described in Summary may be replaced or combined as appropriate in order to solve a part or all of the problems described above or in order to achieve a part or all of the effects described above. Any of the technical features may be omitted as appropriate unless the technical feature is described as essential herein.

What is claimed is:

1. A flow pipe comprising:
a pipe body including a side wall having an opening portion; and
a heat insulator arranged at an inner peripheral side of the pipe body and having a flow path through which a fluid flows, wherein
the heat insulator has an outer peripheral surface facing with the side wall,
the outer peripheral surface has a flow path structure configured to form a flow path that guides a water droplet generated between the heat insulator and the pipe body to the opening portion, and
the opening portion is a slit formed from one end to an other end in a longitudinal direction of the pipe body.

2. The flow pipe according to claim 1, wherein
the flow path structure includes a groove formed along a peripheral direction of the heat insulator,
the groove includes a plurality of grooves, and
the plurality of grooves are formed at regular intervals along the longitudinal direction.

3. The flow pipe according to claim 1, wherein
the flow path structure includes a protruding portion that is in contact with the pipe body.

4. The flow pipe according to claim 1, wherein
the heat insulator includes an aerogel.

5. The flow pipe according to claim 1, wherein
as viewed at a cross section of the flow pipe, the slit is provided toward a downward direction.

6. A flow pipe comprising:
a pipe body having a flow path through which a fluid flows; and
a heat insulator arranged to surround the pipe body in a peripheral direction of the pipe body at an outer peripheral side of the pipe body, wherein
the heat insulator includes a side wall having an opening portion, and having an inner peripheral surface facing with the pipe body,
the inner peripheral surface has a flow path structure configured to form a flow path that guides a water droplet generated between the heat insulator and the pipe body to the opening portion,
the flow path structure includes:
a plurality of first grooves formed along a peripheral direction of the heat insulator and formed at regular intervals along a longitudinal direction of the flow pipe; and
a second groove extending along the longitudinal direction.

7. The flow pipe according to claim 6, wherein
the flow path structure includes a protruding portion that is in contact with the pipe body.

8. The flow pipe according to claim 6, wherein
the heat insulator includes an aerogel.

9. The flow pipe according to claim 6, wherein
the first grooves are formed in a first region excluding a vicinity of the opening portion in the peripheral direction, and the second groove is formed in a second region other than the first region.

* * * * *